US010227956B2

(12) United States Patent
Rowley

(10) Patent No.: US 10,227,956 B2
(45) Date of Patent: Mar. 12, 2019

(54) FUEL VAPORIZING SYSTEM

(71) Applicant: Gerald W Rowley, Delray Beach, FL (US)

(72) Inventor: Gerald W Rowley, Delray Beach, FL (US)

(73) Assignee: Diesel Solutions, LLC, Wilmington, DE (US)

( * ) Notice: Subject to any disclaimer, the term of this patent is extended or adjusted under 35 U.S.C. 154(b) by 80 days.

(21) Appl. No.: 15/357,117

(22) Filed: Nov. 21, 2016

(65) Prior Publication Data

US 2017/0211523 A1 Jul. 27, 2017

Related U.S. Application Data

(63) Continuation-in-part of application No. 15/006,213, filed on Jan. 26, 2016.

(51) Int. Cl.
| | | |
|---|---|---|
| *F02M 33/00* | (2006.01) | |
| *F02M 31/125* | (2006.01) | |
| *F02M 25/022* | (2006.01) | |
| *F02M 25/025* | (2006.01) | |
| *F02M 27/02* | (2006.01) | |
| *F02M 31/16* | (2006.01) | |
| *F02M 27/04* | (2006.01) | |
| *F02M 35/024* | (2006.01) | |
| *F02M 25/028* | (2006.01) | |

(52) U.S. Cl.
CPC ........ *F02M 31/125* (2013.01); *F02M 25/025* (2013.01); *F02M 25/028* (2013.01); *F02M 25/0222* (2013.01); *F02M 25/0224* (2013.01); *F02M 25/0225* (2013.01); *F02M 27/02* (2013.01); *F02M 27/045* (2013.01); *F02M 31/16* (2013.01); *F02M 35/02441* (2013.01); *Y02T 10/121* (2013.01); *Y02T 10/126* (2013.01)

(58) Field of Classification Search
CPC ............... F02M 31/125; F02M 25/028; F02M 35/02441; F02M 25/0224; F02M 25/025; F02M 25/0225; F02M 25/0222; F02M 27/045; F02M 27/02; F02M 31/16
USPC ....................... 123/557, 549, 538, 25 R–25 D
See application file for complete search history.

(56) References Cited

U.S. PATENT DOCUMENTS

| | | | |
|---|---|---|---|
| 4,349,001 A | 9/1982 | Wagner | |
| 4,350,134 A * | 9/1982 | Sparks | ................... F02M 17/26 |
| | | | 123/549 |
| 4,463,739 A | 8/1984 | Niblett | |
| 4,582,040 A | 4/1986 | Niblett | |
| 4,700,047 A | 10/1987 | Crossett et al. | |
| 4,862,858 A * | 9/1989 | Goldsberry | ............ F02M 27/08 |
| | | | 123/538 |

(Continued)

*Primary Examiner* — Marguerite McMahon
(74) *Attorney, Agent, or Firm* — Bachman & LaPointe, P.C.

(57) ABSTRACT

A fuel heater and vaporizing system comprising an engine; a source of fuel coupled to the engine through a fuel supply line; multiple stages of thermal sources thermally coupled to the fuel supply line between the source of fuel and the engine, wherein the multiple stages of thermal sources are configured to heat the fuel; at least one catalyst system configured to supply a source of ions and $H_2$ coupled to the fuel supply, and a sustainable water injection sub-system coupled to the engine, the sustainable water injection sub-system configured to inject water vapor into the engine.

17 Claims, 4 Drawing Sheets

(56) References Cited

U.S. PATENT DOCUMENTS

| | | | | |
|---|---|---|---|---|
| 5,205,250 | A * | 4/1993 | Easterly | F02N 19/04 123/142.5 R |
| 5,671,701 | A * | 9/1997 | O'Donnell | F02B 47/02 123/25 A |
| 6,851,413 | B1 * | 2/2005 | Tamol, Sr. | F02M 27/04 123/536 |
| 7,597,071 | B1 * | 10/2009 | Hirs | F02B 75/045 123/182.1 |
| 8,225,772 | B1 * | 7/2012 | Crowther | F02M 31/125 123/549 |
| 8,707,934 | B2 * | 4/2014 | Rowley | F02M 27/02 123/538 |
| 2008/0276913 | A1 * | 11/2008 | Zubeck | B60K 6/442 123/543 |
| 2010/0050996 | A1 * | 3/2010 | Rowley | F02M 31/18 123/557 |
| 2010/0077986 | A1 * | 4/2010 | Chen | F02M 25/0227 123/25 C |

* cited by examiner

_US 10,227,956 B2_

FUEL VAPORIZING SYSTEM

CROSS-REFERENCE TO RELATED APPLICATIONS

This application is a Continuation-In-Part of U.S. patent application Ser. No. 15/006,213, filed Jan. 26, 2016 and which is also incorporated herein by reference.

BACKGROUND OF THE INVENTION

The present invention relates to a fuel vaporizer system for heating fuel such as gasoline, alcohol, kerosene, diesel, or ethanol, to be used in engines and generators. The above mentioned invention is used to improve diesel engine efficiency resulting in more complete combustion thus lowering fuel consumption and reducing exhaust emissions.

It has been recognized that the efficiency and fuel economy of an internal combustion engine can be improved by preheating the fuel supplied to the engine. Fuel preheating can be accomplished by passing the fuel in route to the engine in heat relationship with engine coolant and/or engine exhaust and/or engine heat from oil and/or engine components. U.S. Pat. Nos. 4,582,040; 4,700,047; 4,349,001; and 4,463,739 illustrate some of these heating systems.

Despite the existence of these systems, there remains a need for a fuel heater and vaporizing system which reclaims water and which heats the fuel in a manner which reduces emissions from the engine or the generator, and the like.

SUMMARY OF THE INVENTION

In accordance with the present disclosure, there is provided a fuel heater and vaporizing system which broadly comprises a source of fuel, a source of heated fluid and/or engine exhaust, and/or hot engine component(s), and a heat exchanger for thermally contacting the source of heated fluid and/or engine exhaust, and/or hot engine component(s), which heat exchanger has a saddle shape and fits over the source of heated fluid and/or engine exhaust, and/or hot engine component(s).

In accordance with the present disclosure, there is provided a fuel heater and vaporizing system comprises a source of fuel; a thermal source; and a heat exchanger configured to thermally couple to the thermal source, the heat exchanger having a saddle shape and being configured to fit over the thermal source.

In an alternative embodiment the heat exchanger has an inlet for receiving fuel from the fuel source, an outlet for discharging fuel, and a hollow passageway extending between the inlet and the outlet.

In an alternative embodiment the heat exchanger has a first sidewall with the inlet, a second sidewall with the outlet, and at least one of an arcuate shaped region and multi-angled region between the first and second sidewalls.

In an alternative embodiment the heat exchanger has an open bottom to allow the heat exchanger to be placed over the thermal source.

In an alternative embodiment the heat exchanger further has at least one coupler configured to hold the heat exchanger in place.

In an alternative embodiment a catalyst system for cracking the heated fuel is included.

In an alternative embodiment the catalyst system comprises a catalyst holder and a plurality of at least one of rods and ribbons of dissimilar metals within the catalyst holder for creating a galvanic reaction.

In an alternative embodiment the plurality of rods and ribbons include a plurality of rods and ribbons formed from a first material and at least one rod/ribbon formed from a second material.

In an alternative embodiment the first material is aluminum or an aluminum alloy, nickel chrome alloy and the second material is one of zinc, a zinc alloy, and zinc plated steel.

In an alternative embodiment the plurality of rods and ribbons formed from the first material are present in a ratio of 2:1 with respect to the at least one rod/ribbon formed from the second material.

In an alternative embodiment the catalyst holder has a plurality of rods/ribbons formed from the second material.

In an alternative embodiment the source of heated fuel is at one of an exhaust muffler, turbo assembly and an exhaust pipe from an engine.

In an alternative embodiment the fuel heater and vaporizing system further comprises a fuel line containing ambient fuel; an inlet line communicating with the fuel line for delivering fuel to the heat exchanger; and an outlet line communicating with the heat exchanger and the fuel line for delivering heated fuel.

In an alternative embodiment the fuel heater and vaporizing system further comprises a valve for allowing blending of the heated fuel with the ambient fuel.

Further in accordance with the present disclosure, there is provided a fuel heater and vaporizing system comprises a heat exchanger for heating a fuel to be supplied to an end use device and a catalyst system for receiving fuel from the heat exchanger and for cracking the heated fuel.

In an alternative embodiment the catalyst system comprises a catalyst holder and a plurality of metallic rods and/or ribbons within the catalyst holder for creating a galvanic reaction.

In an alternative embodiment the plurality of rods includes a plurality of rods and/or ribbons formed from a first metallic material and at least one rod/ribbon formed from a second metallic material.

In an alternative embodiment the first metallic material is aluminum or an aluminum alloy and the second material is one of zinc, a zinc alloy, and zinc plated steel.

In an alternative embodiment the plurality of rods and/or ribbons formed from the first material are present in a ratio of 2:1 with respect to the at least one rod/ribbon formed from the second material.

In an alternative embodiment the catalyst holder has a plurality of rods and/or ribbons formed from the second material.

In an alternative embodiment the heat exchanger is placed into thermal conductive contact with a thermal source of an engine.

In an alternative embodiment the thermal source is one of a radiator hose containing a heated coolant, an exhaust manifold, a turbo charger housing, an engine block, and an engine valve cover.

In an alternative embodiment the heat exchanger has an open-bottom saddle shaped formed by first and second spaced apart sidewalls and an intermediate arcuate shaped region in which the fuel to be heated flows.

Further in accordance with the present disclosure, there is provided a process for heating a fuel to be supplied to an end use device comprises the steps of providing a heat exchanger having an inlet, an outlet, and an arcuate shaped intermediate region. The process includes placing the heat exchanger into thermally conductive contact with a source of heat; heating the fuel by flowing the fuel through the heat exchanger while the heat exchanger is in contact with the source of heat; and cracking the fuel.

In an alternative embodiment the source of heat comprises one of a radiator hose, an exhaust manifold, a turbo charger housing, an engine block, and an engine valve cover, the process further comprises thermally coupling the heat exchanger to at least one of, the radiator hose, an exhaust manifold, a turbo charger housing, an engine block, and an engine valve cover.

In an alternative embodiment the cracking step comprises providing a catalyst system having a catalyst holder in which a plurality of rods and/or ribbons formed from dissimilar materials is placed and flowing the heated fuel into the catalyst holder and around the plurality of rods and/or ribbons.

In an alternative embodiment the process further comprises blending the heated fuel with fuel at ambient temperature.

In an alternative embodiment the process further comprises operating at least one valve responsive to at least one of a thermostat control and a manual control.

Further in accordance with the present disclosure, there is provided a fuel heater and vaporizing system which broadly comprises a heat exchanger for heating a fuel to be supplied to an end use device, and a catalyst system for receiving fuel from the heat exchanger and is utilized as a catalyst for cracking the heated fuel.

Still further in accordance with the present disclosure, there is provided a process for heating a fuel to be supplied to an end use device comprises the steps of providing a heat exchanger having an inlet, an outlet, and an arcuate shaped intermediate region, placing the heat exchanger into thermally conductive contact with a source of heat, heating the fuel by flowing the fuel through the heat exchanger while the heat exchanger is in contact with the source of heat, and cracking the fuel.

Still further in accordance with the present disclosure, there is provided a fuel heater and vaporizing system comprising an engine; a source of fuel coupled to the engine through a fuel supply line; multiple stages of thermal energy sources thermally coupled to the fuel supply line between the source of fuel and the engine, wherein the multiple stages of thermal energy sources are configured to heat the fuel; at least one catalyst system coupled to the fuel, said at least one catalyst system configured to supply a source of ions to said fuel; and a sustainable water injection sub-system coupled to the engine, the sustainable water injection sub-system configured to inject water vapor into the engine.

In an alternative embodiment the fuel heater and vaporizing system further comprises an additional stage coupled to a variable adjustable low voltage offsetting circuit for use in conjunction with an engine control unit or powertrain control module of the engine.

In an alternative embodiment the multiple stages of thermal sources comprise a first stage comprising a fuel line coil coupled to an electrical source, wherein the fuel line coil is configured to produce thermal energy from resistive heat using electrical power from the electrical source, the fuel line coil configured to transfer thermal energy to the fuel inside the fuel line coil.

In an alternative embodiment the electrical source comprises at least one of a battery and a charging system of the engine.

In an alternative embodiment the multiple stages of thermal sources comprise a second stage, the second stage comprising a second stage heater comprising a fin and tube heat exchanger, wherein an engine coolant is a source of thermal energy, the second stage heater configured to transfer the thermal energy of the engine coolant to the fuel.

In an alternative embodiment the multiple stages of thermal sources comprise a third stage comprising a third stage heat exchanger, the third stage heat exchanger comprising an inner fuel housing having an electric cartridge style heater thermally coupled to the fuel; the third stage further comprising a stage three coolant housing surrounding the inner fuel housing, the stage three coolant housing configured to contain engine coolant and transfer thermal energy from the engine coolant to the fuel in the inner fuel housing, the third stage comprising the catalyst system coupled to the fuel.

In an alternative embodiment the catalyst system comprises a catalyst holder and a plurality of at least one of rods and ribbons of dissimilar metals within the catalyst holder for creating a galvanic response reaction with the fuel.

In an alternative embodiment the plurality of rods and ribbons include a plurality of rods and ribbons formed from a first material and at least one rod/ribbon formed from a second material.

In an alternative embodiment the first material is aluminum or an aluminum alloy, nickel chrome alloy and the second material is one of zinc, a zinc alloy, and zinc plated steel.

In an alternative embodiment the multiple stages of thermal sources comprise a fourth stage, the fourth stage comprising an inductive heater coupled to the fuel supply line, wherein the inductive heater is configured to utilize magnetic resonance to induce heat into the fuel supply line proximate the fourth stage.

In an alternative embodiment the fuel line proximate the fourth stage comprises material that generates thermal energy responsive to the inductive heater.

In an alternative embodiment the fuel supply line is configured to flow the fuel through the multiple stages of thermal sources, wherein the fuel is heated and vaporized and contains ions and H2, and flows to at least one fuel injector of the engine.

In an alternative embodiment the sustainable water injection sub-system comprises a housing fluidly coupled to a source of water; a float switch located in the housing and configured to activate a submersible pump responsive to a liquid level in the housing; a water injector fluidly coupled to the submersible pump, the water injector located in an air intake housing of the engine; a transducer fluidly coupled downstream of the water injector, the transducer configured to create a fine mist or vapor of water; and an open cell foam air filter downstream of the water injector, the open cell foam air filter configured to pass the fine mist or vapor of water into an engine air intake passage.

In an alternative embodiment the source of water comprises at least one of condensate from an engine air conditioning evaporator and an auxiliary water and methanol tank.

Still further in accordance with the present disclosure, there is provided a process for heating and vaporizing a fuel flowing in a fuel supply line to be supplied to an end use device comprising heating the fuel by flowing the fuel through multiple stages of thermal sources thermally coupled to the fuel supply line between the source of fuel and the end use device; cracking the fuel with at least one catalyst system configured to supply a source of ions coupled to the fuel supply line; and passing a fine mist or vapor of water into an engine air intake passage, the fine mist of water being created by a sustainable water injection sub-system coupled to the end use device.

In an alternative embodiment the process of heating the fuel further comprises heating the fuel supply line by electrical resistance in the fuel supply line at a first stage; heating the fuel supply line by heat transfer across a tube and fine heat exchanger from engine coolant at a second stage; heating the fuel supply line from thermal energy generated in an electrical cartridge heater and heat transfer from the engine coolant in a hybrid heater at a third stage, wherein said at least one catalyst system is located in the third stage; and heating the fuel supply line by inductive heat supplied from an inductive heater coupled to the fuel supply line at a fourth stage.

In an alternative embodiment creating the fine mist further comprises collecting water from at least one of condensate from a condenser and an auxiliary water tank.

In an alternative embodiment condensate is recycled from the end use device air conditioning system.

In an alternative embodiment the process further comprises providing a variable adjustable low voltage offsetting circuit for use in conjunction with an engine control unit or powertrain control module of the end use device by use of an additional stage coupled to the engine control unit or powertrain control module of the end use device.

Other details of the fuel vaporizing system are set forth in the following detailed description and the accompanying drawings wherein like reference numerals depict like elements.

DETAILED DESCRIPTION

Figure 1:
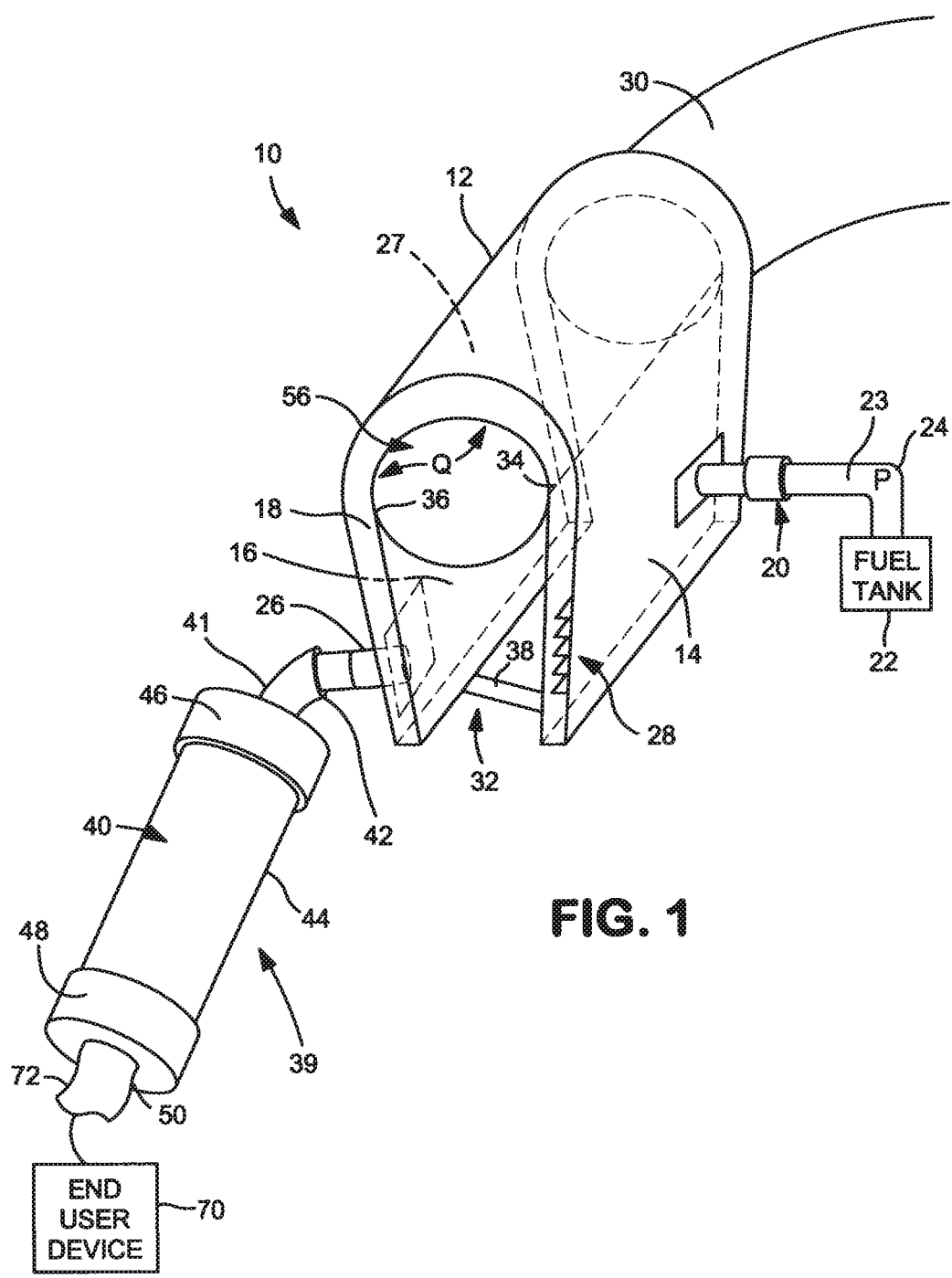
FIG. 1 is a schematic representation of the fuel heating and vaporization system of the present invention.

Referring now to FIG. 1, there is shown a system 10 for preheating fuel to be supplied to a motor engine, such as a diesel engine, or a diesel generator for generating electric power, and other diesel engine applications. The fuel which is heated and vaporized may be gasoline, alcohol, kerosene, diesel, or ethanol. Depending upon the type of fuel, the fuel will be heated at different temperature ranges.

The fuel heating and vaporizing system 10 includes a heat exchanger 12 into which fuel is introduced and heated. The heat exchanger 12 preferably has sidewalls 14 and 16 and an arcuate shaped region 18 connecting the sidewalls 14 and 16. The sidewall 14 has an inlet 20 into which fuel to be heated is introduced from a source of fuel or simply a tank 22 via a connection line 23. A fuel pump 24 may be provided to create a flow of fuel from the tank 22 to the inlet 20.

The heat exchanger 12 has an outlet 26 through which the heated fuel leaves the heat exchanger. The heat exchanger 12 may have a hollow interior through which the fuel flows from the inlet 20 to the outlet 26. The hollow interior may comprise a single passageway 27 for the fuel or may have walls or baffles 28 which create a plurality of passageways within the hollow interior. The baffles 28 are configured to direct the fuel flow and to increase the surface area of the heat exchanger 12.

As can be seen from FIG. 1, the arcuate shaped region 18 fits over a hose 30 which contains a heated fluid. The hose 30 may be a radiator hose and the heated fluid may be the heated coolant which flows through the radiator hose. Alternatively, the hose 30 can be part of the exhaust system which is heated via the exhaust side of the engine. Still further, the hose 30 may be any fluid conduit which contains a heated fluid. Portions 34, 36 of the sidewalls 14 and 16 are in contact with the sidewalls of the hose 30. In a preferred embodiment, the heat exchanger 12 has a saddle shape formed by the arcuate shaped region 18 and the sidewalls 14 and 16. The sidewalls 14 and 16 taper inwardly to ensure a tight fit of the heat exchanger 12 around the hose 30. This causes the hose 30 to be slightly depressed so as to be pushed into place and held in position. If the hose 30 is rigid, then the two sidewalls 14 and 16 may be straight to enable the heat exchanger 12 to fit snugly over the hose or pipe 30. The heat exchanger 12 has a bottom opening 32 which allows the heat exchanger to be easily placed over the hose or pipe 30. If desired, one or more couplers 38, such as, straps, fasteners, bolts, screws and the like may be provided to hold the heat exchanger 12 in place with the respect to the engine component, hose or pipe 30.

The heat exchanger 12, and in particular, the portions of the sidewalls 14 and 16 contacting the hose 30 and the portion of the arcuate shaped region 18 contacting the hose, may be formed from any suitable thermally conductive material known in the art. For example, the heat exchanger 12 and the aforementioned portions thereof may be formed from a metallic material or a plastic material which is thermally conductive and resistant to higher temperatures. In use, the arcuate shaped region 18 and the contact portions 34 and 36 of the sidewalls 14 and 16 are placed in contact with the hose or pipe 30 so that heat, i.e., thermal energy, is conductively transferred from a thermal source 56 to the fuel flowing into and through the heat exchanger 12. The thermal source 56 can include at least one of an engine coolant, engine exhaust, transmission fluid, engine heat from oil, hydraulic fluid, and hot engine components.

One of the advantages of the heat exchanger 12 described herein is that there is a reduced potential for leaks since there is only an inlet, an outlet, and an intermediate hollow passageway in the sidewalls 12 and 14 and the arcuate shaped region 18.

After the fuel has been heated in the heat exchanger 12, the fuel may flow to a catalyst system 39. The catalyst system 39 includes a catalyst holder 40. The heated fuel is caused to flow to an inlet 41 of the catalyst holder 40 via a connecting fuel line 42. In the catalyst holder 40, the heated fuel is cracked. This is done by providing the catalyst holder 40 with a plurality of rods and/or wires and/or ribbons formed from different materials, and in particular dissimilar metallic materials which create a galvanic response.

Figure 2:
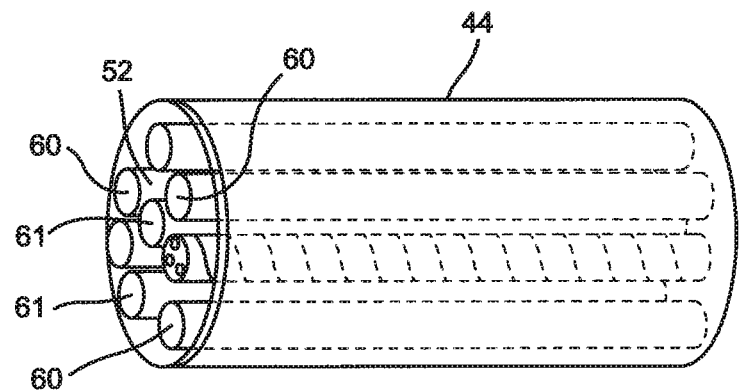
FIG. 2 is a sectional view of a catalyst holder used with the fuel heating and vaporization system of FIG. 1.

As shown in FIGS. 1 and 2, the catalyst holder 40 is formed by a cylindrical tube 44 having end caps 46 and 48. The end cap 46 includes the inlet 41 and the end cap 48 includes an outlet 50. The cylindrical tube 44 creates a volumetric space 52 in which the heated fuel flows. As can be seen from FIG. 2, a plurality of solid rods and/or ribbons and or wires 60 and 61 are positioned within the space 52. The rods and/or ribbons 60 and 61 are present in multiples of three. The fuel flowing in the catalyst holder 40 flows around the rods and/or ribbons 60 and 61 and causes the rods and/or ribbons 60 and 61 to become heated. The plurality of solid rods and/or ribbons and or wires 60 and 61 can be configured as braided or twisted together. The braided configuration increases the contact area between the dissimilar materials. In an exemplary embodiment, the braided plurality of solid rods and/or ribbons and or wires 60 and 61 can be inserted along the fuel flow path, in the fuel line 42 and/or the hollow passageway 27 or space 52. The braided configuration can accommodate a high volume of ion production per length of plurality of solid rods and/or ribbons and or wires 60 and 61.

The rods and/or ribbons 60 may be formed from aluminum, an aluminum alloy, nickel chrome alloy and the like. The rods and/or ribbons 61 may be formed from zinc, a zinc alloy, zinc plated steel, nickel, chromium, platinum, copper, tin and aluminum. In a preferred embodiment, the ratio of the rods and/or ribbons 60 to the rods and/or ribbons 61 is 2:1. In other words, there are two rods/ribbons 60 for each rod/ribbon 61. As noted above, the dissimilar materials of the rods/ribbons 60 and 61 create a galvanic response which comprises a stream of metallic ions and $H_2$ gas which helps to crack the fuel. Cracking helps improve the emissions that are put out by the end use device 70, namely an engine or a generator, to which the heated and cracked fuel flows.

Referring to FIG. 1, the heated and cracked fuel flows from the catalyst holder 40 to the end use device 70 via fuel line 72. Fuel which has been heated and treated with ions using the system 10 including catalyst system 40 of the present invention is better atomized in the end use device 70 and thus burns cleaner, leading to reduced emissions. If desired, the catalyst system may have the rods/ribbons 60 and 61 laying on top of one another in the hollow outlet side of the heat exchanger 12 between the outer wall 14 and the inner wall 16.

Figure 3:
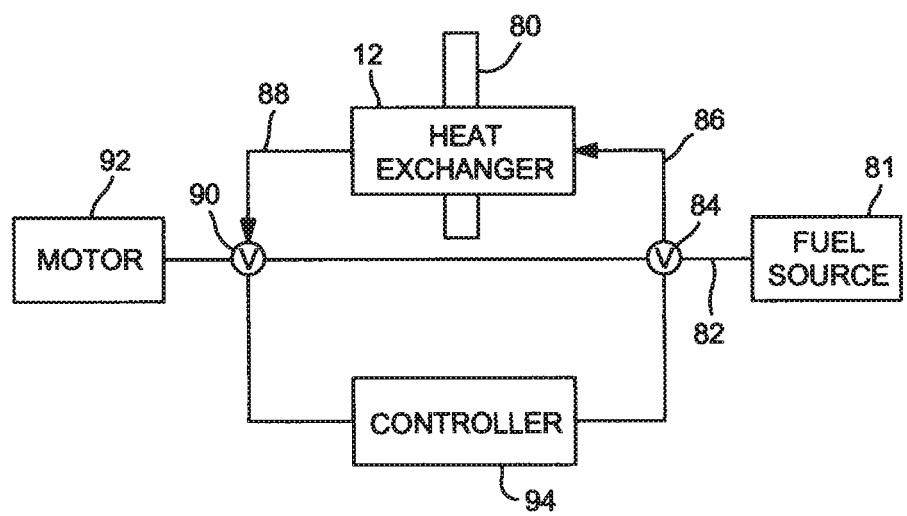
FIG. 3 is a schematic representative of an alternative fuel heating and vaporization system including a temperature range controller.

While the source of heat has been described as being a radiator hose (or other heated engine parts, such as, valve cover, turbo housing, inter-cooler) 30, it could be an exhaust muffler or exhaust pipe 80 on top of a motor. Referring now to FIG. 3, there is shown an embodiment wherein a heat exchanger 12 placed on top of a muffler or exhaust pipe 80. The heat exchanger 12 may be configured as shown in FIG. 1. In this embodiment, the heat exchanger 12 receives fuel from a fuel line 82 containing fuel at ambient temperature via valve 84 and inlet line 86. Ambient temperature refers to the temperature of the environment where the fuel is stored in source 81. The system further has a heated fuel outlet line 88 which may be open or closed via valve 90. The heated fuel exiting the heat exchanger 12 may be mixed or blended with the fuel in the fuel line 82. By doing this, the temperature of the fuel flowing to the motor 92 may be controlled. One or more controllers 94 may be provided to control the valves 84 and 90 and this regulates the flow of fuel to/from the heat exchanger 12 and the temperature of the fuel. For example, if desired, the valve 90 may be operated so that (1) only heated fuel flows to the motor 92; (2) only ambient temperature fuel flows to the motor 92; or (3) a blend of heated/ambient fuel at a desired temperature flows to the motor 92.

Figure 4:
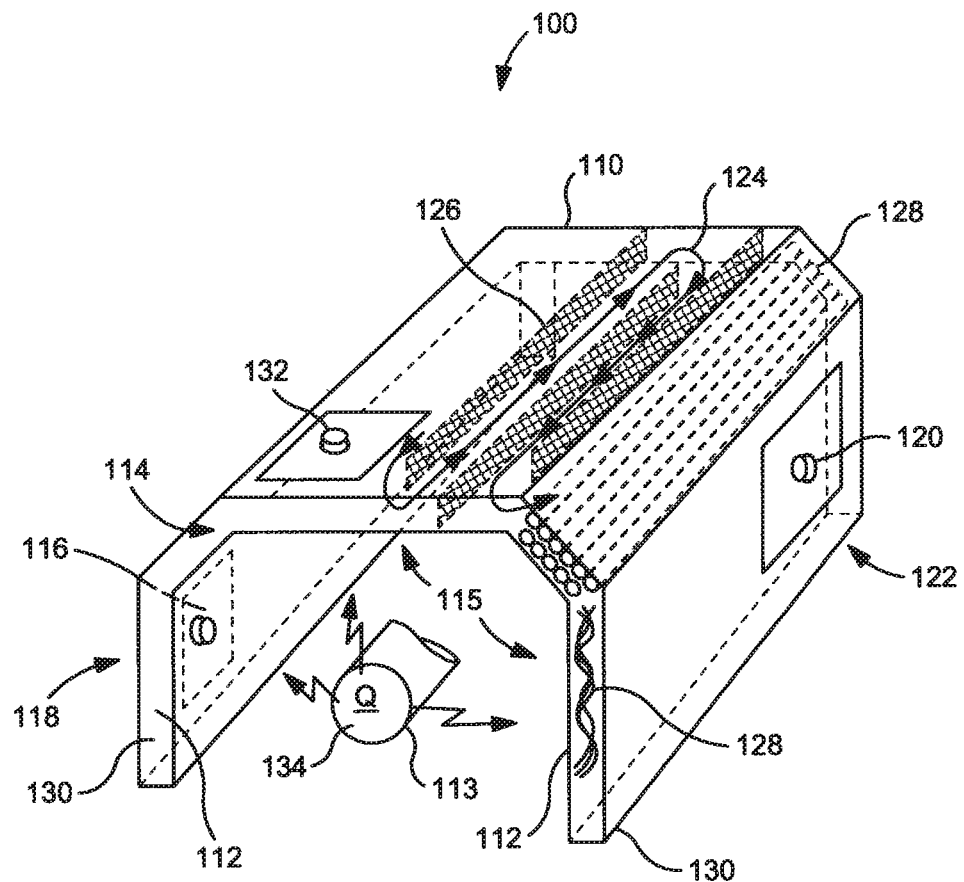
FIG. 4 is a schematic representation of an alternative embodiment of the fuel heating and vaporization system of the present invention.

Referring to FIG. 4, another alternative embodiment of a heating and vaporizing system 100 can be seen. The heating and vaporizing system 100 includes a heat exchanger 110 having sidewalls 112. The sidewalls 112 form a volumetric space 114. The sidewalls 112 can be aligned to form a multi-angled region 115 configured to receive an engine component 113, such as hose 30 shown at FIG. 1, or other engine component that produces thermal energy. An inlet 116 is formed in the sidewall 112 at a first location 118. An outlet 120 is formed in the sidewall 112 at a second location 122 distally from the first location 118. Fuel flow 124 (shown as arrows) can be directed through the volumetric space 114 from the inlet 116 to the outlet 120.

Baffles 126 can be located in the volumetric space 114 and configured to direct the fuel flow 124 in a serpentine fashion and configured to maximize the heat transfer to the fuel flow 124. The baffles 126 also are configured to situate a catalyst material 128 in a position to maximize the ionic activity between the fuel flow 124 and the catalyst 128. The catalyst material 128 in the form of braided wire can also be located along the fuel flow path in the space 114. The volumetric space 114 can include legs 130 that are hollow. The legs 130 can also facilitate storage of the catalyst 128. A port 132 can be included in the heat exchanger 110 that is configured to vent air entrapped in the fuel flow 124. The port 132 can also be utilized to add fuel into the heat exchanger 110. As in the embodiments described above, the heat exchanger 110 is configured to thermally couple with a heated engine source, such as a valve cover or exhaust manifold. The relatively hot valve cover or exhaust manifold is a thermal source 134 or simply a source of heat.

In an alternative embodiment additional components can be included in the system to further improve the engine efficiency.

The overall system can be apportioned into six main stages operating in unison to complete the high efficiency operation of a diesel engine both aspirated and non-aspirated.

Figure 5:
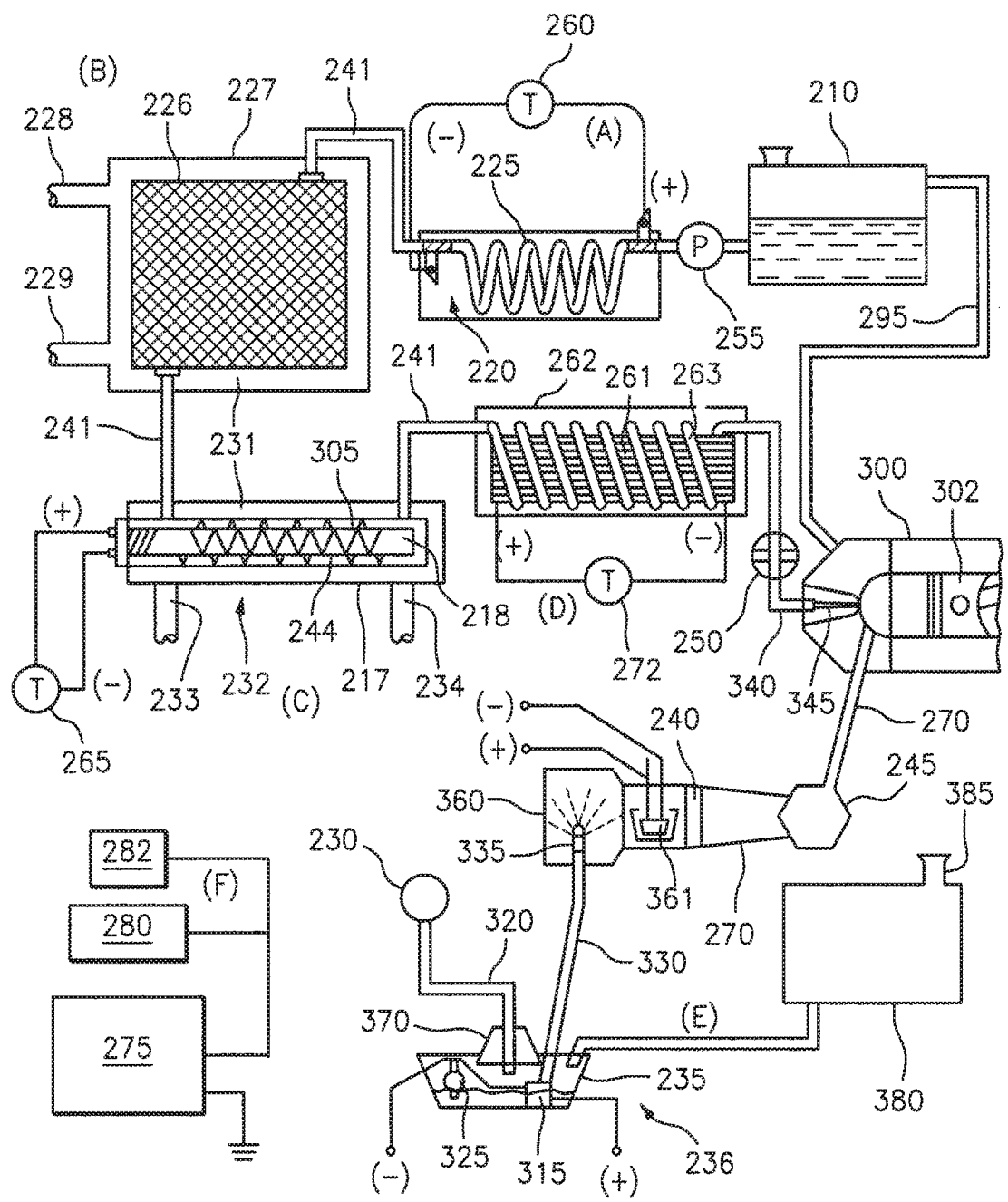
FIG. 5 is a schematic representation of an alternative embodiment of the fuel heating and vaporization system of the present invention.

Referring to FIG. 5, the first major stage A is the first stage heating and vaporization in the fuel delivery system. The second major sub-system B is the second stage heating and vaporization in the fuel delivery system. The third major stage C is the third stage heating and vaporization in the fuel delivery system. The fourth major stage D is the fourth stage heating and vaporization in the fuel delivery system. The fifth major stage E is the sustainable water injection subsystem with water produced from the running A/C system. The sixth major stage F is the new generation V.A.L.V.O.C. circuit that runs in conjunction with the ECU or PCM.

The first stage heating and vaporization A of the fuel delivery system is made up a number of parts and follows a set progression as the fuel flows from the fuel tank 210 to the engine 300. The main fuel supply is held in the fuel tank 210. The fuel is pushed to the first stage heating and vaporization (A) via an inline fuel pump 255. The fuel pump 255 moves fuel from the main tank 210 to bring fuel to the fuel line coil 225 inside a housing with insulation 220. The fuel is heated inside the fuel line coil 225 which acts as a resistive type heater using electric power from a battery and charging system 275.

Each of the two ends of fuel line coil 225 are electrically insulated so they do not conduct current past the entering and the exiting ends of the fuel line proximate the fuel line coil 225. By electrically insulating the ends of fuel line coil 225, the current is restricted to flow only through the metal tubing of fuel line coil 225. The metal tubing of fuel line coil 225 acts as a heating element due to the electrical resistive heat generated in the metal tube 225. The temperature of the fuel is brought to a predetermined temperature level by controls in a solid state thermostat relay or first stage thermostat switch 260. The first stage can raise the fuel temperature of the fuel to about 125 degrees Fahrenheit (F).

The heated fuel is then moved along to the second stage heating and vaporization B stage. The fuel enters second stage heater 226. Second stage heater 226 can include a modified finned air conditioning condensing unit with multiple turns of metal tubing. In an exemplary embodiment the second stage heat exchanger can be a transmission cooler or oil cooler that is used in reverse to add heat to the circulating fuel. Externally attached fins are utilized to absorb heat from the surrounding environment via the fuel line 241. The second stage heat exchanger 226 with finned tubing absorbs heat from the surrounding engine coolant 231 which is housed in a coolant housing chamber 227 of the second stage heat exchanger 226.

The engine coolant 231 that fills the chamber 227 is circulated using the engine's water pump and circulating system (not shown) of the existing diesel engine 300. The circulating coolant 231 enters and exits the coolant housing chamber 227 via an inlet 228 and an outlet 229. The heated engine coolant 231 is kept in constant motion using the water pump of the existing engine. More heat is added to the fuel at the second stage B which raises the temperature of the fuel to the next plateau. The fuel temperature can be raised to about 135 degrees F.

The third stage heating and vaporization C of the fuel delivery system is made up of a number of components, generally called a stage three heat exchanger 232. The fuel is still being pushed to the stage three heat exchanger 232 of the third stage heating and vaporization stage C via the inline fuel pump 255. The fuel pump 255 moves fuel from the main tank 210 through the previous stages A and B to an inner fuel housing 244. Inside the inner fuel housing 244 is an electric cartridge style heater 218 which brings the fuel temperature up to the next desired temperature plateau.

The electric cartridge style heater 218 is energized by power preferably from a DC to AC inverter. The cartridge heater is in the range of 1200 watts to 1800 watts. This power range assists in bringing the temperature of the fuel to the higher desired level. The inverter takes the DC power from the 12 volt charging system/battery 275 and converts the DC electricity to 110 volts AC. The power is controlled by a solid state thermostat relay 265 which is set at a predetermined temperature setting.

In addition to electric cartridge style heater 218, there is a sleeve, water jacket, or a stage three coolant housing 217 that surrounds the inner fuel housing 244 and allows the circulating coolant 231 to bathe the outside of the inner fuel housing 244 with hot coolant. The stage three heat exchanger 232 is a hybrid heater because it uses two types of heat exchange simultaneously. The fuel is heated by an electric cartridge style heater 218 on the inside of the inner fuel housing 244 and the fuel is heated by the hot coolant 231 on the outside of the inner fuel housing 244.

The hot coolant 231 is kept circulating by the engine's water pump 255 applying pressure to the liquid entering and exiting inlet 233 and outlet 234 of the housing 217.

The fuel temperature is controlled by a solid state thermostat 265 which allows the electric cartridge type heater 218 to be turned on and off to maintain the desired temperature. The heat range of the third heating and vaporization stage C is approximately 136 degrees F. to 147 degrees F.

An addition to the third heating stage C is a fuel catalyst 305. The fuel catalyst 305 is configured to react with the fuel without being reacted upon. The hot fuel passes over the fuel catalyst 305 which interacts with the fuel and adds metallic ions and (H2) molecules to the fuel, known as a galvanic response as described above.

The fuel catalyst 305 consists of at least two dissimilar metals that when in contact with one another react to complete the galvanic response. This galvanic response reaction discharges a stream of charged particles (ions) and a stream of (H2) molecules. The metal combinations can be both precious and non-precious types and are available commercially. The metals can consist of iron, copper, zinc, aluminum, tin, platinum, chromium, nickel, or other suitable metal. The metal material can be small diameter rods, wire strands, shavings, or other forms as long as they have the ability to contact the surface area of the other dissimilar metal material and remain in constant contact.

The heated fuel and ions move from stage C to the fourth stage, stage D which includes an inductive heater 261. The inductive heater 261 uses magnetic resonance to induce heat into a substance. The fuel line in this section 263 is made up of a material that reacts to the induction heater 261 and is heated. The fuel line 263 transfers the heat to the fuel traveling through the fuel line 263. The fuel line 263 and the inductive heater 261 is housed in the inductive or fourth heater housing 262 along with insulation and supports.

The inductive heater 261 is energized by power preferably from a DC to AC inverter. The inductive heater 261 is in the power range of 1200 watts to 1800 watts. This power range assists in bringing the temperature of the fuel to an even higher desired level. The inverter takes the DC power from the 12 volt charging system/battery 275 and converts it to 110 volts AC. The power is controlled by a solid state thermostat relay 272 which is set at a prescribed Temperature Setting. The inductive heater 261 is turned on when the solid state thermostat relay/switch (normally open) senses that the fuel entering the chamber is not at the selected operating heat range. The desired temperature range in stage D is 146 degrees F. to 160 degrees F.

The heated/vaporized fuel is then passed to the injector pump 250 which increases the fuel line pressure to a fuel injector line 340 then passes the fuel to the fuel injectors 345 of the diesel engine 300. The fuel passes through the injection pump 250 into the injectors 345 and into the combustion chamber above the piston 302 of the diesel engine 300. The fuel that is not consumed is returned to the fuel tank 210 via a fuel return line 295.

The first four stages of the system (A), (B), (C), and (D) deal with treating and heating the fuel. Stage (E) or the fifth Stage deals with treating the air coming into the diesel engine 300. Stage E allows the introduction of misted/fogged/vaporized condensate water into the air intake of the diesel engine 300. The fifth stage E uses a sustainable water injection system 236 with open cell foam that uses condensate water from the engine's air conditioning evaporator 230.

As the vehicle air conditioner operates it produces condensate that drips from the evaporator 230. This water is captured by a collector and a drip tube 320 and directed towards an inverted catch funnel 370 on top of the sustainable water system housing 235.

The sustainable water source is produced from the vehicle's evaporation component of the air conditioning system 230. When the vehicle's air conditioning system or defrost system is operating it produces water/condensate as a byproduct from removing the humidity from the vehicle's cabin air shell/cavity. This water is collected from the evaporator 230 to a housing/sump 235 with a collector and a drain hose 320 that normally would discharge the water from the vehicle onto the ground. This normally discarded water is captured and directed into the sustainable water system catch container/housing 235 via drip tube 320. The sustainable water system housing 235 consists of a container that has sloped walls. The sloped walls prevent any potential ice from pushing out and destroying the container. Also, the top of the housing 235 includes the funneled entry 370 with a screen to prevent leaves and other contaminants from entering the housing 235. The water level in the housing 235 is monitored by a float switch 325. When the water level in the housing 235 reaches a predetermined height, a submersible pump 315 is activated. The water is pumped from the housing 235 to a water injector 335 inside an air intake housing 360 via a water feed tube 330.

The water is misted by the water injector 335. The misted water is then passed to an ultrasonic transducer 361 and broken down further into a fine mist/fog/vapor and is passed on to an open cell foam air filter 240. The fine mist water is drawn through the intake housing 270 via a vacuum created by the engine 300. Outside air drawn into the air intake housing 360 pulls the moisture from the foam filter 240 into the engine air intake passage 270. The misted/fogged air also helps cool a Turbocharger 245. The mixture of air and fine misted/fogged/vaporized water enters the combustion chamber of the diesel engine 300 to mix with the fuel mixture. Combining water with the combustion mix creates a cooling effect on the valves and reduces emissions and allows more 02 to mix in the fuel/air charge.

In an alternative embodiment, an auxiliary water methanol holding tank 380 can be utilized during the seasons when the air conditioner is not in use and condensate is not available. A fill tube 385 for the auxiliary tank 380 is used to add water and methanol. Water from the auxiliary tank 380 will fill the housing 235 automatically when the condensate no longer fills the housing 235.

The final stage of the Process is stage F which allows a proprietary chip, the new generation V.A.L.V.O.C. circuit 282 to operate. The V.A.L.V.O.C. circuit 282 works in conjunction with the engine's ECU (Engine Control Unit) or PCM (Powertrain Control Module) 280 to give better fuel consumption results and lower emissions. The new generation V.A.L.V.O.C. circuit 282 adjusts the value of the 5 Volt Reference going to the ECU or PCU through a MAP sensor or intake air ambient temperature sensor. The circuit 282 uses three 555 timer components and three potentiometers to offer a precise variable adjustable low voltage offsetting circuit. Details of this arrangement can be found in U.S. Pat. No. 8,100,114 incorporated by reference herein.

The fuel heater and vaporizing system described herein may be used with any internal combustion engine, diesel engine, or any electrical generator which burns fuel. The fuel heater and vaporizing system 10 described herein has particular utility in heating and vaporizing diesel fuel used in diesel engines and for heating and vaporizing fuel used in engines that drive barges and diesel generator power plants and other diesel engine applications.

The fuel heater and vaporizing system described herein allows the combustion process to change allowing more 02 to attach to the hydrocarbon molecules, thus releasing more energy and burning some of the H2 that is released during use of the device.

The overall system allows for higher atomization of the fuel, more oxygenation of the fuel, an introduction of hydrogen, charged ions and addition of vaporized water all combining to increase the efficiency of the combustion process.

The overall operation of the exemplary apparatus uses four stages of heating the fuel and adding ions, one stage (E) for treating the air entering the engine using sustainable water supply and fogging the water, and a final stage (F) for tuning the engine's ECU 280 to give the best combustion and performance. This process has shown to decrease fuel consumption from 10%-25%. This same process has shown to reduce carbon monoxide levels to ZERO on certain engines and reduce other exhaust emissions.

The disclosed six stages work in unison to provide a near perfect charge of air, humidity, and vaporized fuel mixture to produce a maximum combustion effect in the combustion chambers of the diesel engine. This maximum combustion effect results in lower fuel consumption while maintaining engine performance and lowering exhaust emissions There has been provided in accordance with the instant disclosure a fuel heating and vaporizing system. While the fuel heating and vaporizing system has been described in the context of a specific embodiment thereof, other unforeseen alternatives, modifications, and variations may become apparent to those skilled in the art having read the foregoing detailed description. Accordingly, it is intended to embrace those alternatives, modifications, and variations as fall within the broad scope of the appended claims.

What is claimed is:

1. A fuel heater and vaporizing system comprising:
an engine;
a source of fuel coupled to the engine through a fuel supply line;
multiple stages of thermal energy sources thermally coupled to the fuel supply line between the source of fuel and the engine, wherein the multiple stages of thermal energy sources are configured to heat the fuel; wherein the multiple stages of thermal sources comprise a first stage comprising a fuel line coil coupled to an electrical source, wherein the fuel line coil is configured to produce thermal energy from resistive heat using electrical power from the electrical source, the fuel line coil configured to transfer thermal energy to the fuel inside the fuel line coil;
at least one catalyst system coupled to the fuel, said at least one catalyst system configured to supply a source of ions and $H_2$ to said fuel; and
a sustainable water injection sub-system coupled to the engine, the sustainable water injection sub-system configured to inject water vapor into the engine.

2. The fuel heater and vaporizing system of claim 1, further comprising an additional stage coupled to an engine control unit of the engine, the additional stage comprising a circuit for use in conjunction with at least one of an engine control unit and powertrain control module of the engine.

3. The fuel heater and vaporizing system of claim 1, wherein the electrical source comprises at least one of a battery and a charging system of the engine.

4. The fuel heater and vaporizing system of claim 1, wherein the multiple stages of thermal sources comprise a second stage, the second stage comprising a second stage heater comprising a fin and tube heat exchanger, wherein an engine coolant is a source of thermal energy, the second stage heater configured to transfer the thermal energy of the engine coolant to the fuel.

5. The fuel heater and vaporizing system of claim 1, wherein the multiple stages of thermal sources comprise a fourth stage, the fourth stage comprising an inductive heater coupled to the fuel supply line, wherein the inductive heater is configured to utilize magnetic resonance to induce heat into the fuel supply line proximate the fourth stage.

6. The fuel heater and vaporizing system of claim 5, wherein the fuel line proximate the fourth stage comprises material that generates thermal energy responsive to the inductive heater.

7. The fuel heater and vaporizing system of claim 1, wherein the fuel supply line is configured to flow the fuel through the multiple stages of thermal sources, wherein the fuel is heated and vaporized and contains ions and H2, and flows to at least one fuel injector of the engine.

8. The fuel heater and vaporizing system of claim 1, wherein the source of water comprises at least one of condensate from an engine air conditioning evaporator and an auxiliary water and methanol tank.

9. A fuel heater and vaporizing system comprising:
an engine;
a source of fuel coupled to the engine through a fuel supply line;
multiple stages of thermal energy sources thermally coupled to the fuel supply line between the source of fuel and the engine, wherein the multiple stages of thermal energy sources are configured to heat the fuel;
wherein the multiple stages of thermal sources comprise a third stage comprising a third stage heat exchanger, the third stage heat exchanger comprising an inner fuel housing having an electric cartridge style heater thermally coupled to the fuel; the third stage further comprising a stage three coolant housing surrounding the inner fuel housing, the stage three coolant housing configured to contain engine coolant and transfer thermal energy from the engine coolant to the fuel in the inner fuel housing, the third stage comprising the catalyst system coupled to the fuel;
at least one catalyst system coupled to the fuel, said at least one catalyst system configured to supply a source of ions and $H_2$ to said fuel; and
a sustainable water injection sub-system coupled to the engine, the sustainable water injection sub-system configured to inject water vapor into the engine.

10. The fuel heater and vaporizing system of claim 9, wherein the catalyst system comprises a catalyst holder and a plurality of at least one of rods and ribbons of dissimilar metals within the catalyst holder for creating a galvanic response reaction with the fuel.

11. The fuel heater and vaporizing system of claim 10, wherein the plurality of rods and ribbons include a plurality of rods and ribbons formed from a first material and at least one rod/ribbon formed from a second material.

12. The fuel heater and vaporizing system of claim 11, wherein the first material is aluminum or an aluminum alloy, or nickel chrome alloy and the second material is one of zinc, a zinc alloy, and zinc plated steel.

13. The fuel heater and vaporizing system of claim 1, wherein the sustainable water injection sub-system comprises:
a housing fluidly coupled to a source of water;
a float switch located in the housing and configured to activate a submersible pump responsive to a liquid level in the housing;
a water injector fluidly coupled to the submersible pump, the water injector located in an air intake housing of the engine;
an ultrasonic transducer fluidly coupled downstream of the water injector, the transducer configured to create a fine mist or vapor of water; and
an open cell foam air filter downstream of the water injector, the open cell foam air filter configured to pass the fine mist or vapor of water into an engine air intake passage.

14. A process for heating and vaporizing a fuel flowing in a fuel supply line to be supplied to an end use device comprises:
heating the fuel by flowing the fuel through multiple stages of thermal sources thermally coupled to the fuel supply line between the source of fuel and the end use device; wherein heating the fuel further comprises:
heating the fuel supply line by electrical resistance in the fuel supply line at a first stage;
heating the fuel supply line by heat transfer across a tube and fin heat exchanger from engine coolant at a second stage;
heating the fuel supply line from thermal energy generated in an electrical cartridge heater and heat transfer from the engine coolant in a hybrid heater at a third stage, wherein said at least one catalyst system is located in the third stage; and
heating the fuel supply line by inductive heat supplied from an inductive heater coupled to the fuel supply line at a fourth stage;
cracking the fuel with at least one catalyst system configured to supply a source of ions coupled to the fuel supply line; and
passing a fine mist or vapor of water into an engine air intake passage, the fine mist of water being created by a sustainable water injection sub-system coupled to the end use device.

15. The process of claim 14, wherein creating the fine mist further comprises:
collecting water from at least one of condensate from a condenser and an auxiliary water tank.

16. The process of claim 14, wherein said condensate is recycled from the end use device air conditioning system.

17. The process of claim 14, further comprising:
providing a precise variable adjustable low voltage offsetting circuit for use in conjunction with at least one of an engine control unit and powertrain control module of the end use device by use of an additional stage coupled to at least one of the engine control unit and powertrain control module of the end use device.

* * * * *